United States Patent [19]
Alessi

[11] Patent Number: 5,634,619
[45] Date of Patent: Jun. 3, 1997

[54] POLE-SUPPORTED APPARATUS AND CLAMP FOR USE THEREWITH

[76] Inventor: Carlo Alessi, 341 Linwood Ave., Ridgewood, N.J. 07450

[21] Appl. No.: 565,431

[22] Filed: Nov. 30, 1995

[51] Int. Cl.$^6$ .................................................. A47B 96/06
[52] U.S. Cl. ............................ 248/219.3; 248/230.1
[58] Field of Search ........................... 248/219.3, 218.4, 248/219.4, 230.1, 230.4, 230.5, 231.51, 229.13

[56] References Cited

U.S. PATENT DOCUMENTS

| | | |
|---|---|---|
| 171,146 | 12/1875 | Langdon . |
| 663,121 | 12/1900 | Frost . |
| 2,876,027 | 3/1959 | Sulmonetti ..................... 248/229.23 |
| 3,003,646 | 10/1961 | Wolf . |
| 3,167,292 | 1/1965 | Meyerowitz . |
| 3,194,403 | 7/1965 | Van Horn, Jr. . |
| 3,332,654 | 7/1967 | Jacobson . |
| 3,530,996 | 9/1970 | Schaffer . |
| 5,305,978 | 4/1994 | Current ........................... 248/230.4 |
| 5,335,889 | 8/1994 | Hopkins et al. . |
| 5,400,991 | 3/1995 | Werner . |
| 5,405,113 | 4/1995 | Jaw ............................ 248/230.1 X |
| 5,842,239 | 1/1996 | Smith ............................ 248/229.13 |

FOREIGN PATENT DOCUMENTS

| | | | |
|---|---|---|---|
| 1060179 | 3/1954 | France | ................. 248/230.5 |
| 1594730 | 3/1960 | France | ................. 248/230.5 |

OTHER PUBLICATIONS

ALU company catalog sheets, ALU, 138 West 25th Street, New York, New York 10001 (6 sheets).

*Primary Examiner*—Ramon O. Ramirez
*Attorney, Agent, or Firm*—Jordan and Hamburg

[57] ABSTRACT

A clamp for use as part of a pole-supported apparatus, such as a display system, permits one or more articles to be held in fastened engagement to a support pole for securement thereof at a selected position therealong in a facilitated manner. The clamp includes a collar portion which permits attachment to the support pole, and at least one article clamping portion which captively holds the article, and which is connected to the collar. The collar is open at both ends thereof, and is sized and shaped to receive the support pole therethrough in the longitudinal direction. The collar is divided substantially in half along a longitudinal axis thereof to form two halves connected by a hinge to one another, allowing the collar to be opened for lateral reception of the support pole. The collar is compressively locked about the support pole by tightening a screw extending through a flange disposed on one of the collar halves which is threadingly received adjacent the other half of the collar. The article clamping portion includes a pair of arms separated from one another to define a receiving channel therebetween for receiving therein a portion of an article to be held thereby. An article is then secured conveniently by inwardly disposed screws which apply pressure thereto when tightened. An embodiment permits rotational orientation of the article clamping portion with respect to the collar.

21 Claims, 7 Drawing Sheets

POLE-SUPPORTED APPARATUS AND CLAMP FOR USE THEREWITH

BACKGROUND OF THE INVENTION

The present invention relates to pole-supported systems used for displays, work stations, and the like, and more particularly to a versatile pole-mounted display apparatus which facilitates temporary set-up and break-down of set-ups and which is particularly well suited for use at trade shows, department stores, and other like venues.

In furthering the sale of a product, whether it be goods or services, a key factor in promoting same is effective display in a manner which maximizes exposure to the viewing public. With regard to advertisement of services, a display will generally consist of visually appealing signs or other viewable media detailing the particular services and the associated benefits thereof. Such advertising material is generally mounted to a support structure to prevent unwanted movement thereof and to orient same in a position which affords optimal viewability. Merchandise is similarly displayed by use of modular hardware for holding and displaying same in various manners, the hardware being mountable to the support structure at various locations therealong. Such a display may additionally be accompanied by advertising in the form of signs or the like. In either case, prominent display and mechanical versatility of the display support apparatus, permitting orientation of the advertising media, including both actual merchandise or representations thereof, is an important aspect of any display system designed for such purpose. Furthermore, advantageously a feature of any such system is to allow a particular display arrangement to be altered at any time to permit changes in content or positional orientation of same. In order to make the most efficient use of available space, such display systems should also ideally permit prominent and unobstructed display of a wide variety of items at various heights and positions along a support structure.

Department store displays, as well as other locations publicly accessible on a regular basis, will include various displays of merchandise presently available for purchase, generally presented in an aesthetically pleasing manner to enhance appeal to the buying public. Clothing, for example, will typically be displayed in a manner depicting the current style trend, in a variety of suggested combinations aimed at facilitating selection by the individual purchaser. Such displays are generally changed seasonally, and commonly at more frequent periodic intervals to achieve varied product exposure.

Trade shows afford a convenient venue in which a large number of the target market may view a particular product line. Attendance at such shows may either supplement exposure where a permanently accessible location is available to the would-be consumer, or alternatively provide a sole means for the seller to reach prospective buyers in person. Trade shows present a particular challenge to product presentation. Vender space at trade show is generally sold as one or more booths of various sizes, priced accordingly, and therefore, depending on budget constraints, presentation space may be sharply limited. Therefore, a display system designed for use at trade shows should ideally maximize use of available space, while at the same time provide an assembled display which permits prominent, unobstructed viewing of a wide choice of component media elements in a manner which allows the user to alter the configuration and positional orientation of the individual display elements thereof as desired. Furthermore, insofar as trade shows are of generally short duration, a desirable structural design should permit such displays to be easy and rapidly assembled and dismantled at the display site. Moreover, since trade shows are often held at locations far remote from the seller's ordinary place of business, any display system designed for such use should ideally be provided in a form which permits compact packaging for shipment when disassembled. Because such displays will generally be required for only limited engagements, such compact form will also facilitate storage between use.

Pole-supported systems are also widely used for setting up work stations and the like, in which various functional components such as, for example, equipment, tables, drawing boards, etc. are grouped as desired. Since proper functional arrangement will directly affect productivity, such system should ideally permit changes to the existing setup to be made easily, and at the same time permit versatile placement of the components as desired.

Although addressed by the prior art in a number of embodiments directed to development of a versatile pole-supported system, none are believed to have heretofore adequately provided an apparatus which permits convenient assembly of an attractive modular system in a manner as is presented herein.

OBJECTS AND SUMMARY OF THE INVENTION

Accordingly, it is an object of the invention to provide a structurally supported system which overcomes the drawbacks of the prior art.

It is a further object of the invention to provide a clamp for use with a structural support system which accommodates a variety of mixed media and different gauges of materials, for purposes of visual presentation, storage, architectural decor, and functional space planning, including seating, work station and shop concepts.

It is a still further object of the invention to provide such clamp in a form which permits an article to be located and secured virtually anywhere along a pole-supported structure, and which allows a wide range of angular positioning with respect thereto.

It is yet a further object of the invention to provide a clamp for use with a pole-supported apparatus which permits rapid assembly and dismantling of the setup, without the use of tools.

It is yet another object of the invention to provide the clamp in a lightweight, aesthetically pleasing and easy to handle form capable of supporting weight in excess of its anticipated application, and which may be economically produced.

Briefly stated, there is provided an a clamp for use as part of a structurally supported apparatus, such as a display system, in which one or more articles are held in fastened engagement to a support pole for display or functional use thereof at selected positions on the support pole. The clamp is designed to permit interconnection between the articles and the support pole, allowing such a display to be erected and dismantled quickly and easily without the requirement of tools. The features afforded by the clamp permit versatile placement of the various articles along the support pole and allows a wide range of orientational positioning with respect thereto. The clamp in accordance with the invention is comprised of a collar portion which permits attachment to the support pole, and at least one article clamping portion which captively holds the article and is connected to the collar. The collar is open at both ends thereof and is sized and shaped to receive the support pole therethrough in the longitudinal direction. The collar is divided substantially in half along a longitudinal axis thereof to form two halves hingably connected longitudinally to one another, allowing the collar to be opened for lateral reception of the support pole. This feature permits various clamps to be mounted anywhere along a support pole already in fixed position. The hinge on the collar then allows closure about the support pole for captive reception of the support pole therethrough. Means for applying contact pressure on the support pole when the collar is oriented in a closed position are provided, in a convenient manner, for example, by collar structure permitting closure of thereof beyond a diameter of the support pole. A screw extending through a flange disposed on one of the collar halves in a position opposite the hinge is received in a flange having a threaded aperture on the other half of the collar to conveniently provide means for applying closure pressure and locking the collar in the closed position. At least one article clamping portion is attached to the collar in a position extending outwardly therefrom. The article clamping portion includes a pair of arms oriented along a common plane and separated from one another to define a receiving channel therebetween for receiving a portion of an article to be held. Means are provided on the article clamping portion for engaging the article and for inhibiting its motion relative thereto, conveniently, for example, in the form of screws, threadingly received in one or both arms, positioned to extend into the receiving channel in a direction towards the facing surface of the opposed arm.

In an advantageous embodiment, the clamp in accordance with the invention is designed for use with a support structure having a cylindrical support pole. The collar is correspondingly cylindrical and is comprised of a first and second half formed by bisecting the collar along a plane aligned with the longitudinal axis thereof. The first and second halves are connected to one another by a hinge disposed along corresponding longitudinal edges defined by the bisected configuration, to form a cylindrical tube-shaped collar which may be opened and closed as desired. An attachment rib is disposed longitudinally along the remaining longitudinal edge of the first half of the collar, aligned with a flange disposed along the remaining longitudinal edge of the second half. A screw is received through a clearance hole in the flange and threadingly received in a tapped hole in the attachment rib to provide a convenient means for maintaining the hinged collar in a closed position. By providing a space between the corresponding remaining edges of both collar halves when the inner diameter of the collar is that of the support pole, pressure may be applied to the support pole received therethrough to secure the clamp to the support structure. This configuration permits an arc of an inner surface of the collar halves to be conformably configured to that of the support pole for complete circumferential contact. The embodiment includes a single article clamping portion connected conveniently to the outwardly facing side of the attachment bar having a longitudinal axis thereof extending radially outward. The article clamping portion is of bifurcated form, which includes the above described pair of arms which are advantageously disposed parallel with the longitudinal axis to define the receiving channel therebetween. The article clamping portion is optionally permanently fixed to the collar or is alternatively removably mounted to allow rotation about a longitudinal axis of the article clamping member. In the latter alternative, locking means are further provided for locking the article clamping portion at a particular selected rotational position with respect to the longitudinal orientation of the collar. When only two selectable positions are provided, for example allowing the common plane of the arms to be aligned with the longitudinal axis of the collar in one position and rotated 90° in a second position, such locking means are optionally be in the form of a square-shaped protrusion formed on the attachment rib and a correspondingly shaped receiving indentation in the end of the article clamping portion. When fitted together in the selected orientation, the article clamping portion is fastened in an appropriate manner to the attachment rib on the collar, for example, by a screw centrally located through the square protrusion and indentation. In this way, the securement screw need not be removed entirely to change the rotational orientation, merely loosened sufficiently to permit release of the engagement between the matching protrusion and indentation.

In an alternative embodiment, a clamp includes a plurality of article clamping portions which extend radially from a single collar. The clamp is as described with regard to the preceding embodiment, with the addition that a desired number of article clamping portions are attached in like fashion to the collar at selected radial positions thereon. In a particularly advantageous embodiment, three article clamping portions are provided, separated from one another by a 120° arc, and the rotational orientation of the common plane of the arms of the article clamping portions is at 90° to the longitudinal axis of the collar. This configuration permits formation of a tripod support when leg support members are clamped at upper portions thereof within the receiving channel of the article clamping portion at an outwardly and downwardly descending angle therewith.

Additionally, the present invention is particularly suited to its embodiment as a kit with which components for constructing a suitable display apparatus or work station can be provided so that the user has at hand, with purchase of a kit, all that is needed to achieve that end. Such a kit would contain, for example, one or more support poles, a desired number of various clamps for affixing various hardware articles thereto, and a selection of display hardware suitable for appropriately accommodating an array of media which could be attached to the support pole by the purchaser at selected locations and desired orientational positions via the supplied clamps. Display hardware could include, for example, clothing rods, tables, display boards, hooks, etc., each directed to appropriate display of a particular article or media representation. A similar kit could be provided for constructing a work station comprising modular functional equipment in place of display hardware. Such kits would conveniently be boxed, and could be supplied as a custom selected assortment of component parts to suit the particular needs of the purchaser.

The above, and other objects, features and advantages of the present invention will become apparent from the following description read in conjunction with the accompanying drawings, in which like reference numerals designate the same elements.

DETAILED DESCRIPTION OF THE INVENTION

Figure 1:
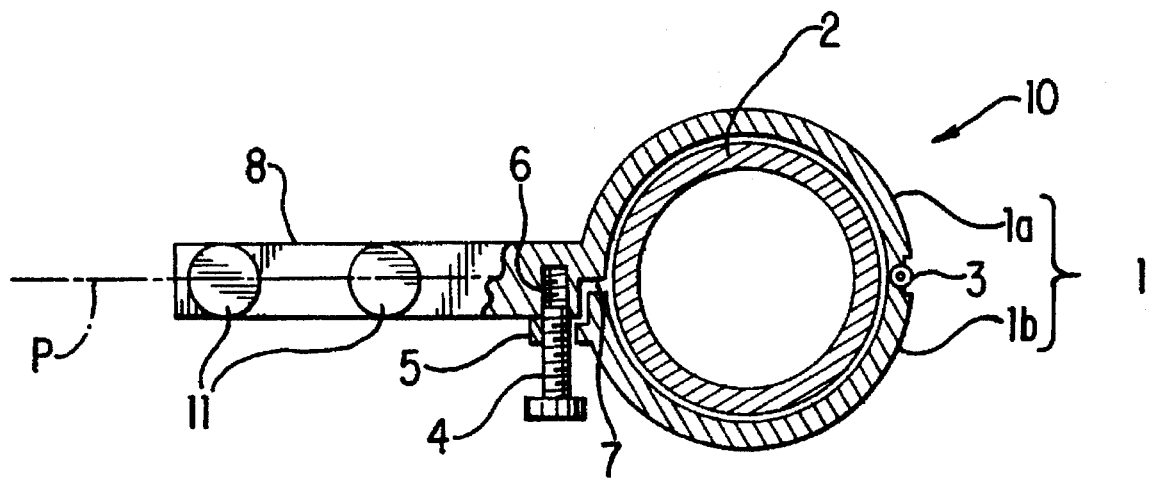
FIG. 1 is a plan view of an embodiment of a clamp in accordance with the invention, in which the common plane of the arms of the article clamping portion is aligned with the longitudinal axis of the collar portion.
Figure 2:
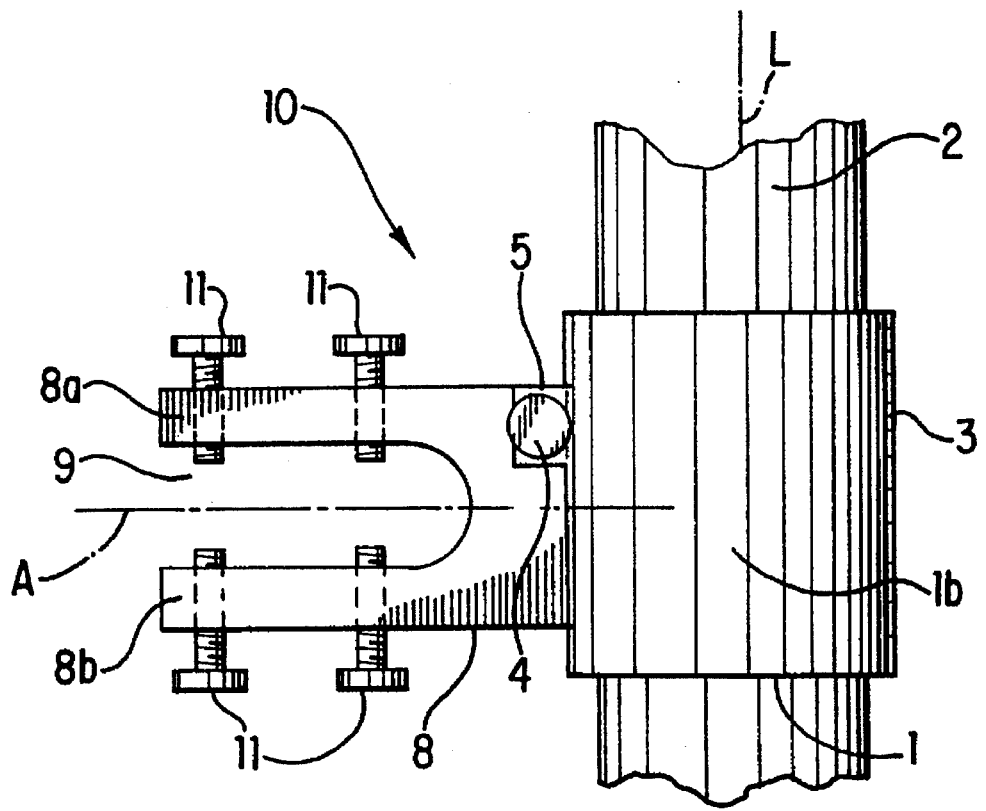
FIG. 2 is a side view of the clamp of FIG. 1.

Referring now to the drawings, and in particular FIGS. 1 and 2, there is shown a clamp 10, in accordance with the invention, for use as a part of a pole-supported apparatus, such as those used for displays, storage units, architectural decor, and functional space planning, including seating, work station and shop concepts. In such systems, a pole is generally supported in a vertical position by securement means at the base and/or the end thereof at ceiling level. The pole securement means generally includes a plate, extendable from the end of a pole by rotation of a threaded support, which is used to extend the functional pole length to clamp the pole between the ceiling and floor. It is noted, however, that clamp 10 will also find application for use with poles oriented horizontally or at other various angles.

Clamp 10 includes a collar portion 1 which permits attachment to a support pole 2, which in the presently described embodiment is advantageously of cylindrical shape, and which is optionally disposed vertically. Although any cross-sectionally shaped pole is contemplated within the intended scope of the invention as claimed, selection of a cylindrical shape permits rotation of clamp 10 to any desired orientation. Collar 10 is advantageously of a shape corresponding to support pole 2, i.e. cylindrical in the embodiment as depicted, and is open at both ends thereof, sized and shaped to receive support pole 2 therethrough in the longitudinal direction. Collar 10 is divided substantially in half along a longitudinal axis thereof to form two halves 1a and 1b, hingably connected longitudinally to one another, conveniently by a hinge 3, disposed along corresponding longitudinal edges defined by the bisected configuration, to form a cylindrical tube-shaped collar 1 which is opened and closed as desired. This configuration permits collar 10 to be opened for lateral reception of support pole 2, allowing various ones of clamp 10 to be mounted anywhere along support pole 2.

The collar 10 is closed about support pole 2 for captive reception of support pole 2 therethrough. Means for applying contact pressure on support pole 2 when collar 10 is closed thereabout are provided in a convenient manner, for example, by collar structure permitting closure thereof beyond an outer diameter of support pole 2. By providing a space 7 between the corresponding edges of both collar halves 1a and 1b, when the inner diameter of collar 1 is the same as that of support pole 2, pressure is applied to support pole 2 received therethrough to secure clamp 10 to the support structure, while at the same time permitting the arc of the inner surface of the collar halves 1a and 1b to be conformably configured to that of support pole 2 for complete circumferential contact.

Figure 3:
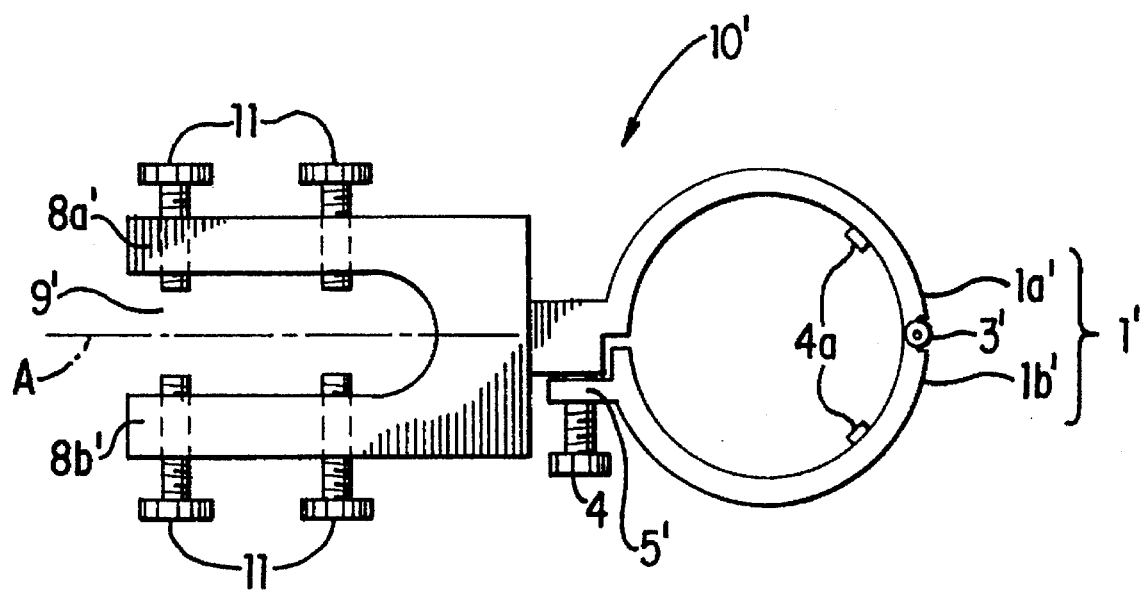
FIG. 3 is a plan view of an embodiment of a clamp in accordance with the invention, in which the common plane of the arms of the article clamping portion is perpendicular with the longitudinal axis of the collar portion.

Means for securing clamp 10 on support pole 2 is provided, for example, in the form of a collar securement screw 4 extending through a clearance hole in a flange 5 disposed in a radial position on collar half 1b opposite hinge 3, and which is threadingly received in a tapped receiving hole 6 provided in a corresponding position adjacent the other collar half 1a. By tightening collar securement screw 4, pressure is exerted on support pole 2 to maintain a position of clamp 1 by virtue of frictional forces created therebetween. Optionally, as shown in FIG. 3, a non-slip inner surface configuration is provided within collar 1, such as, for example, a resilient material 4a with a high coefficient of friction, bonded to collar 1 to further inhibit slidable movement.

Attached to collar 1, or formed as an extension thereof, is at least one article clamping portion 8, disposed outwardly therefrom. Article clamping portion 8 includes a pair of arms 8a and 8b oriented along a common plane P, and separated from one another to define a receiving channel 9 therebetween for receiving therein a portion of an article, such as display hardware, to be held thereby. Means are provided on article clamping portion 8 for engaging the article and for inhibiting its motion relative thereto, conveniently, for example, in the form of article clamping screws 11, threadingly received in one or both arms 8a and 8b and positioned to extend into receiving channel 9 in a direction towards the facing surface of an opposed one of arms 8a and 8b. In the embodiment depicted, article clamping screws 11 are disposed in both arms 8a and 8b, in positions directly opposing ones in a facing one of arms 8a and 8b. The location of article clamping screws 11 in arms 8a and 8b may be altered without departure from the invention. Collar securement screw 4 and article clamping screws 11 are conveniently provided with knurled heads to permit hand operation, thereby obviating the need for tools during assembly and dismantling of the apparatus. Other head configurations facilitating tightening by hand are realizable by those of ordinary skill in the art and are considered within the scope of the present invention.

Figure 4:
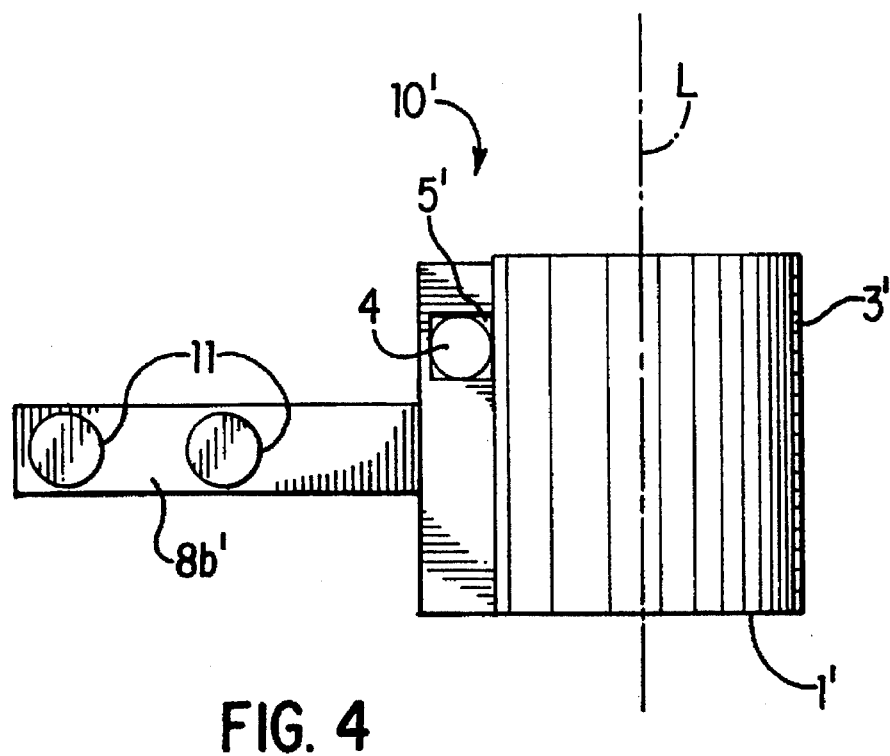
FIG. 4 is a side view of the clamp of FIG. 3.

It is noted that for optimal aesthetic appearance and for economy of structure, article clamping portion 8 is attached to collar 1 in a radial position opposite hinge 3. This permits tapped receiving hole 6 to be formed directly in article clamping portion 8, which would otherwise require additional structure if article clamping portion 8 were located elsewhere. It is further noted, that although, in the embodiment depicted, common plane P of arms 8a and 8b are aligned with a longitudinal axis L of collar 1, plane P may instead be oriented at an angle with longitudinal axis L. For example, by orienting article clamping portion 8 in a position rotated 90° about central axis A from the rotational orientation depicted FIGS. 1 and 2, a clamp 10' in which common plane P is perpendicular with longitudinal collar axis L may be provided, as shown in FIGS. 3 and 4. Clamp 10' differs in structure from clamp 10 as depicted in FIGS. 1 and 2 only in orientation, and therefore the same reference numerals are use to designate like elements, with the addition of a prime after the number to clearly distinguish embodiments.

Figure 5A:
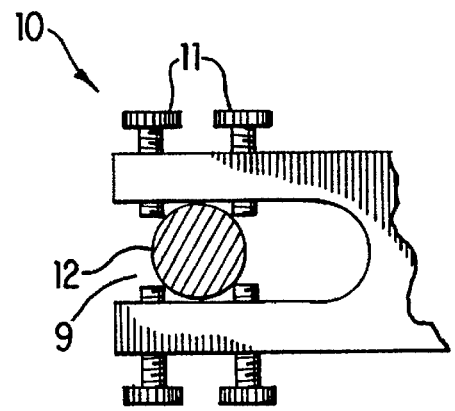
FIG. 5a is an operational side view shown in partial cross-section of the clamp of FIGS. 1 and 2, used to secure a clothing rod.
Figure 5B:
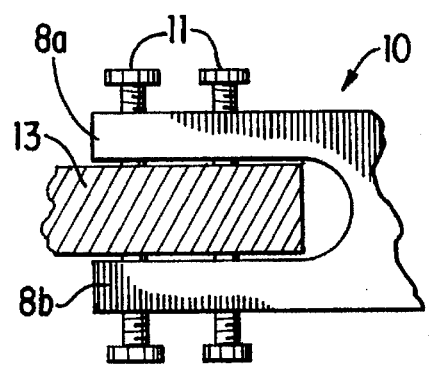
FIG. 5b is an operational side view shown in partial cross-section of the clamp of FIGS. 1 and 2, used to secure a board.
Figure 5C:
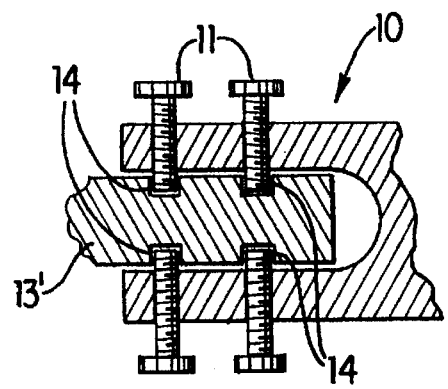
FIG. 5c is an cross-sectional operational side view shown in partial cross-section of the clamp of FIGS. 1 and 2, used to secure a board having holes formed therein for receiving ends of the article clamping screws.

The manner in which various articles are inserted into receiving channel 9 and 9' will depend upon which of many suitable means for engaging the article and for inhibiting its motion in incorporated in the clamp design. However, for purposes of illustrating operation of a structural example utilizing article clamping screws, such as for example is relied upon in the previously described embodiments, several operational examples with regard to this configuration are depicted in FIGS. 5a, 5b and 5c. It will be apparent to one of ordinary skill in the art that specifically designed clamps having structure suited to particular applications and articles may be designed to target specific needs and such alterations are considered to be within the scope and spirit of the present invention.

Referring to FIG. 5a, a clothing rod 12 is retained in receiving channel 9 of a clamp 10 of the embodiment as shown in FIGS. 1 and 2. Pressure exerted by screws 11 prevent movement thereof. This article clamping operation will be equally effective in holding a post of a sign, when for example, disposed vertically through receiving channel 9' of a clamp embodiment as depicted in FIGS. 3 and 4. Turning now to FIG. 5b, a planar member 13, such as for example a board, table top, or like, is received between arms 8a and 8b and retainment pressure is exerted thereon by tightening article clamping screws 11. For applications requiring maximum securement, a board 13' is optionally equipped with holes 14 aligned with article clamping screws 11 for receiving same therein when tightened as shown in FIG. 5c. As mentioned above, although the described examples include two pairs of article clamping screws 11 disposed two on each arm 8a and 8b, a clamp may be provided which includes only article clamping screws 11 on only one of arms 8a and 8b, wherein securement pressure is exerted from only one side of the article to be held in place. The article is pressed against the remaining one of arms 8a and 8b which is optionally provided with a non-slip surface configuration. In addition, it will be recognized by those skilled in the art that structure other than or in addition to screws as used in the above described example may be used to provide alternative means for article securement between arms 8a and 8b, and such are contemplated within the scope of the invention.

Figure 6:
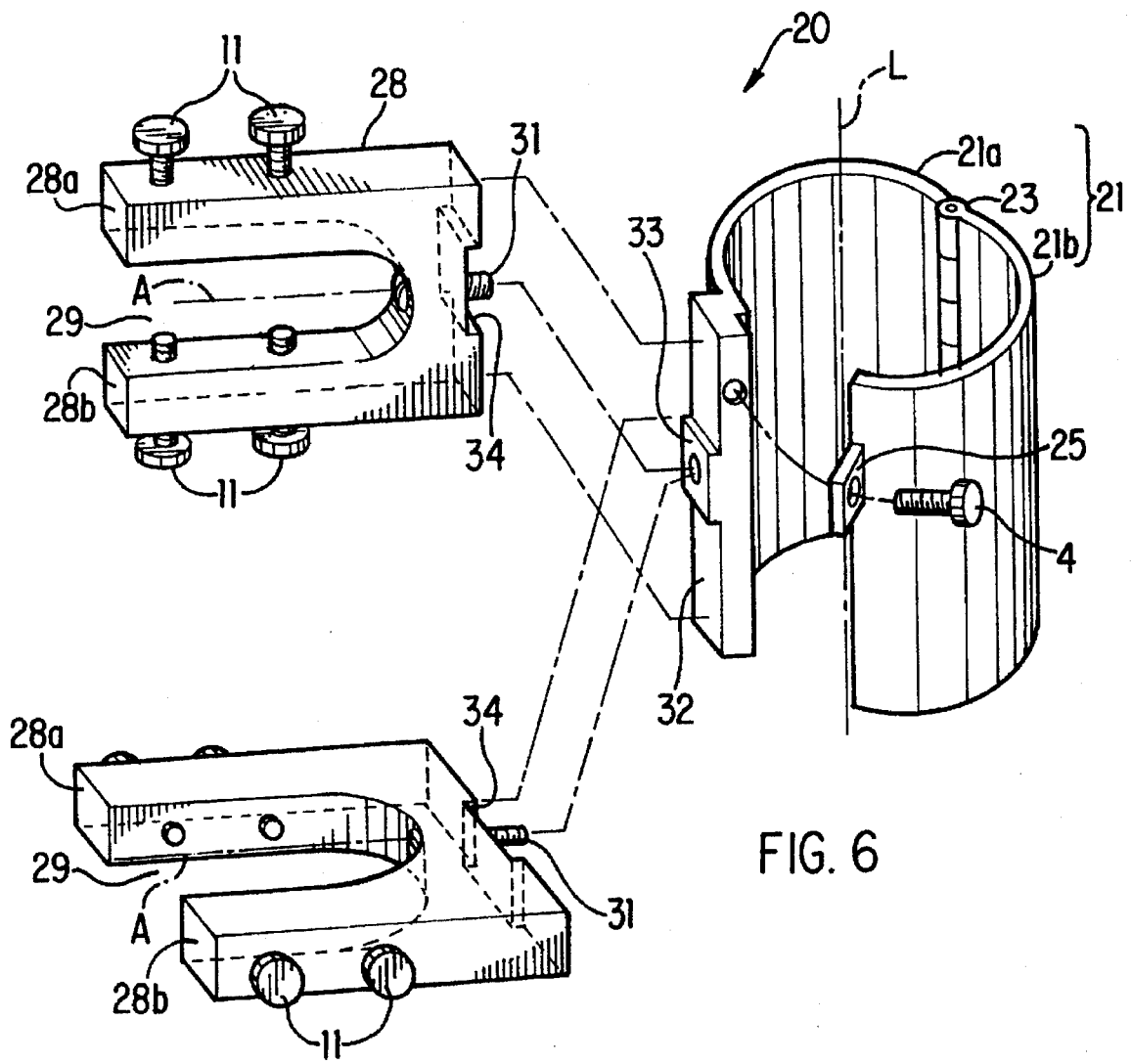
FIG. 6 is a perspective, view of another embodiment of a clamp in accordance with the invention which permits the article clamping portion to be oriented at selected 90° relative rotational position with respect to the collar.

Turning now to FIG. 6, an embodiment is depicted which permits selectable rotational positioning in 90° increments of an article clamping portion 28 with respect to the longitudinal axis L of a collar portion 21 of a clamp generally designated 20. With the exception of the feature permitting use of clamp 20 at desired selected rotational positions, structural and operational aspects of clamp 20 are equivalent to those already described with regard to the previously disclosed embodiments. For example collar 21 includes two halves 21a and 21b, hingably connected by a hinge 23 disposed along corresponding longitudinal edges. Collar securement screw 4 is received through a hole in a flange 25 and threadingly received in structure adjacent collar 21 for securement thereof in a closed position about a support pole, such structure conveniently in the form of an attachment rib 32 which runs the length of collar 21 opposite hinge 23. Article clamping portion 28 includes a bifurcated structure comprised of a pair of arms 28a and 28b defining a receiving channel 29 therebetween. In the depicted embodiment, article clamping portion 28 is not however permanently fixed to collar 21 as in the previously described embodiments, but rather is securable thereto by suitable means, for example by an orientation screw 31 threadably received in a tapped hole formed in attachment rib 32 disposed along central axis A of article clamping portion 28 to permit rotation thereof about central axis A when orientation screw 31 is loosened.

Means are advantageously further provided for locking article clamping portion 28 at a particular selected rotational position with respect to longitudinal axis L of collar 21. This is conveniently in the form of a square-shaped protrusion 33 formed on attachment rib 32, and a correspondingly shaped receiving indentation 34 formed in the end of article clamping portion 28. When fitted together in one of the selected orientations as shown in FIG. 6, article clamping portion 28 is fastened to attachment rib 32 by orientation screw 31. Square-shaped protrusion 33 is received in conforming engagement within receiving indentation 34, maintaining the selected orientation, and preventing rotation thereof. Since protrusion 33 and receiving indentation 34 are both square, only two orientational positions are possible, i.e. one on which the common plane of arms 28a and 28b are aligned with longitudinal axis L of collar 21, oriented as shown by the upper depicted article clamping portion 28 shown in FIG. 6, or another in which article clamping portion 28 is rotated 90° about central axis A such that the common plane of arms 28a and 28b are perpendicular with longitudinal axis L of collar 21, as indicated by the lower depicted article clamping portion 28 shown in FIG. 6.

In an alternative embodiment, where more than two selectable rotational positions are desired, other suitable means for rotational locking may be employed, for example a gear-like member carded on the attachment rib of the collar, and a correspondingly shaped receiving indentation in a terminal end the article clamping portion for interlocking therewith. The number of selectable positions permitted would then be determined by the number of gear teeth provided. Various other locking means are realizable by those skilled in the art and are considered within the scope of the present invention.

Figures 7, 8:
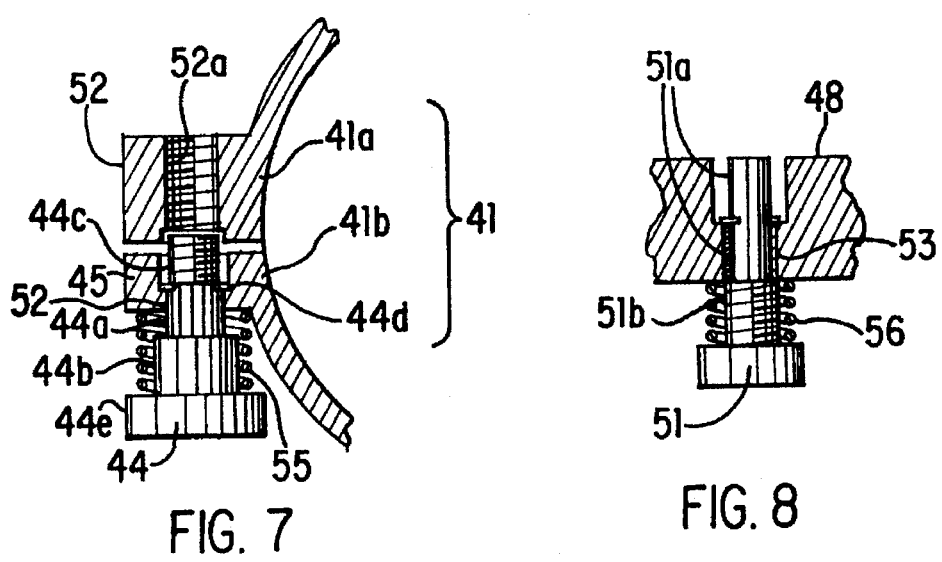
FIG. 7 is a detail of an optional captive screw embodiment.
FIG. 8 is a detail of an optional captive screw embodiment.

In another embodiment, a clamp is described, which for optional convenience includes captive screw arrangements applicable to either of the collar securement screw or the article clamping screws. Referring now to FIGS. 7 and 8, structural examples of such captive arrangement are depicted, as described below with reference thereto.

FIG. 7 illustrates a collar 41 comprised as described above, and including hingably connected first and second halves 41a and 41b. A captive securement screw 44 includes a small diameter portion 44a, a large diameter portion 44b and a threaded portion 44c. A clearance hole in 52 is formed in a flange 45 to permit clearance-fit reception of threaded portion 44c and small diameter portion 44a but to prevent passage of large diameter portion 44b. A captivating ring 44d is disposed between threaded portion 44c and small diameter portion 44a, preventing removal of captive screw 44 from flange 45 when threaded portion 44c is disengaged from accommodating threads 52a formed in an attachment rib 52 disposed along an edge of collar half 41a. A spring 55 is retained between flange 45 and a knurled screw head 44e to prevent rattling of captive screw 44 by outwardly biasing same. When captive screw 44 is threaded into accommodating threads 52a and tightened, larger diameter portion 44b engages flange 45 to secure collar in a closed, compressive state about a support pole.

FIG. 8 illustrates a similar captive arrangement with regard to an article clamping screw 51 received through an arm of an article clamping portion 48. Captive article clamping screw 51 includes an un-threaded portion 51a a threaded portion 51b, and a knurled screw head 51c. A captivating ring 51d is disposed within un-threaded portion 51a to prevent removal of captive article clamping screw 51 from a threaded hole 53 in article clamping portion 48 through which un-threaded portion 51a is received in clearance fit. A spring 56 is retained between article clamping portion 48 and knurled screw head 51c to prevent rattling of captive article clamping screw 51 when threaded portion 51b is disengaged from threaded hole 53 by outwardly biasing same. When captive article clamping screw 51 is pushed against the spring 56 and threaded into the accommodating threads of hole 53, pressure is applied as needed to secure an article in a manner as described with respect to the prior embodiments.

Figure 9:
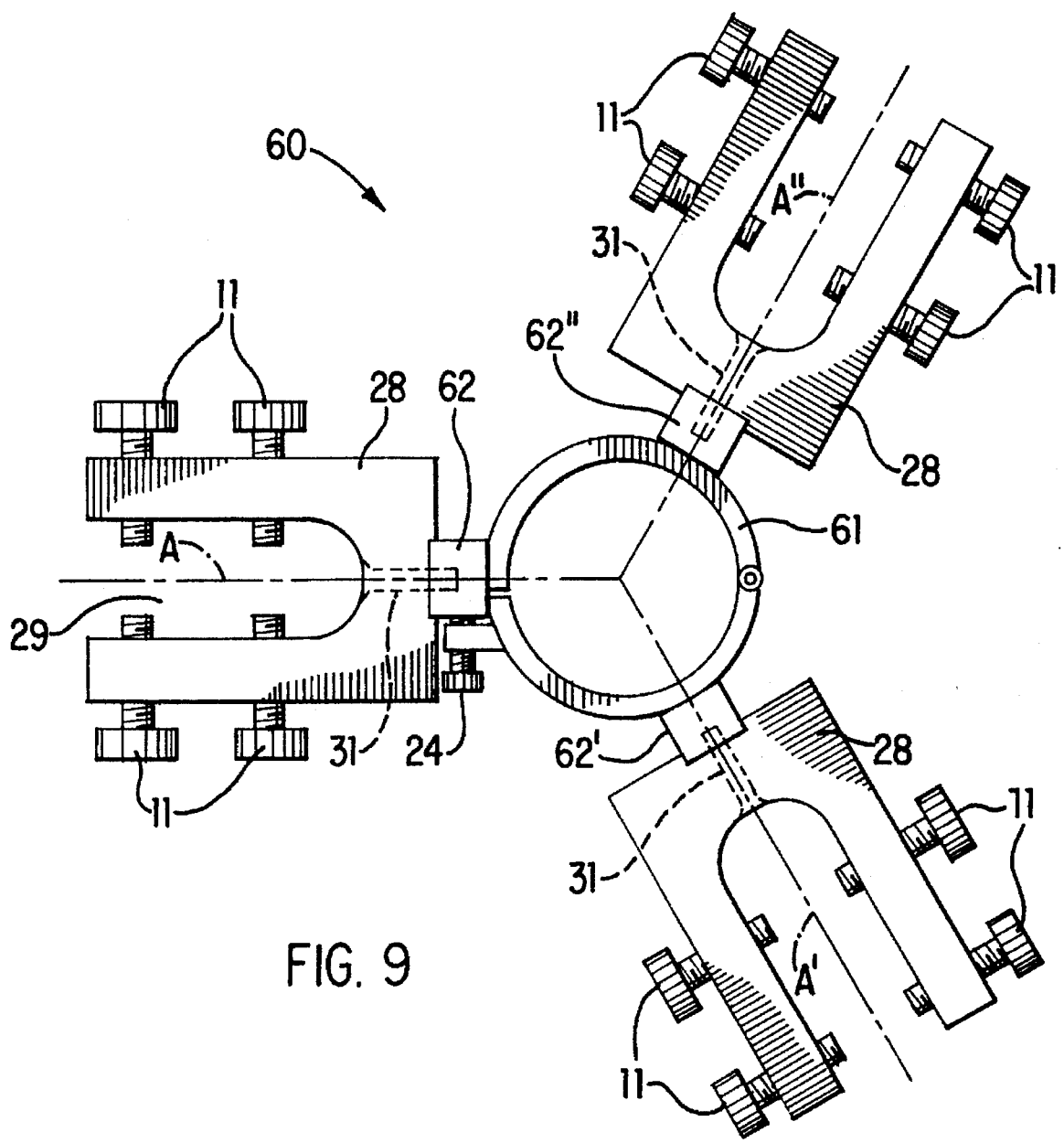
FIG. 9 is a plan view of an embodiment in which multiple (three) article clamping portions are disposed about a collar.
Figure 10:
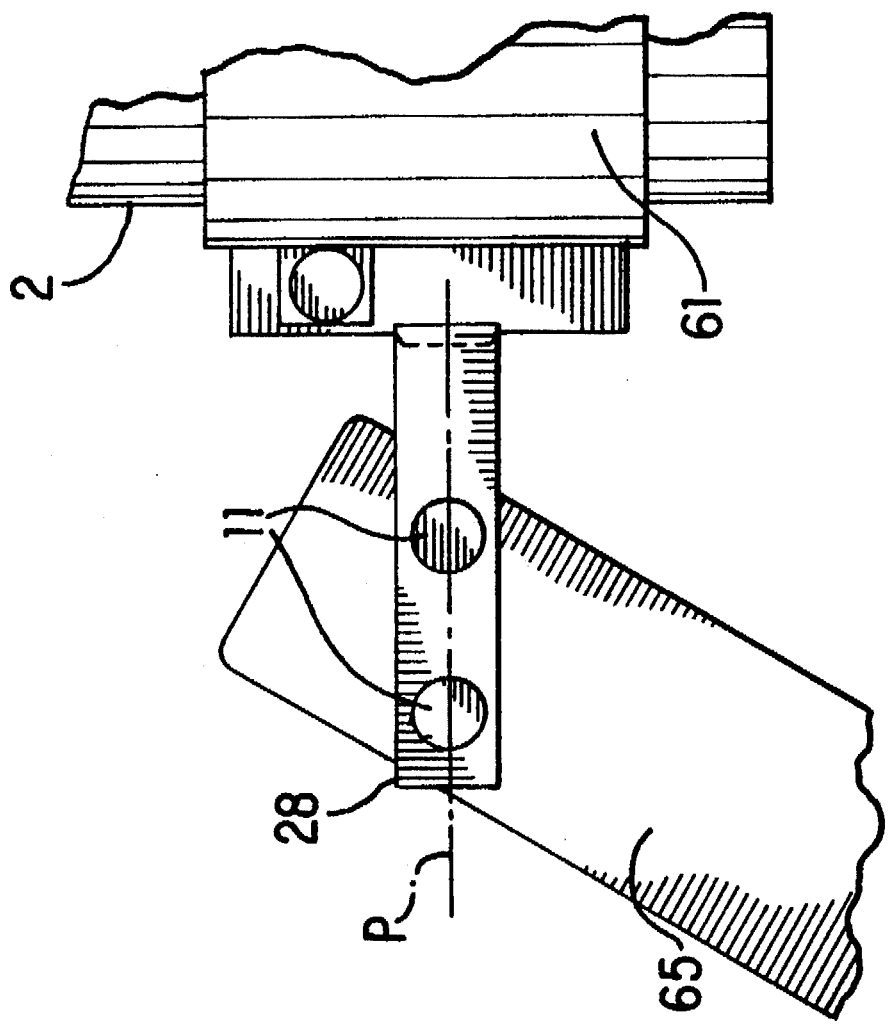
FIG. 10 is a partial side view a mode of the embodiment of FIG. 8 directed to use as a support tripod.

Referring now to FIGS. 9 and 10, another embodiment in accordance with the invention permits multiple articles to be held in various radial position about a clamp, generally designated 60. In the embodiment as depicted, clamp 60 specifically permits retention of three articles in equally spaced radial positions, separated from one another by 120°. A collar 61, of the general structure as described with reference to the embodiment depicted in FIG. 6, includes an attachment rib 62 of equivalent structure to attachment rib 32 in that embodiment, with the addition of two more attachment ribs 62' and 62" in 120°-spaced radial locations about collar 61. Only attachment rib 62, however, includes a threaded hole for receiving collar securement screw 4. Three article clamping portions 28 of the structure described with regard to FIG. 6 are received each on a corresponding ones of attachment ribs 62, 62' and 62" and secured thereto by orientation screws 31 (represented by broken lines) of the type and positioning as previously described. When affixed to collar 61, respective ones of central axes A, A' and A" corresponding to each positioned article clamping portion 28 are separated from one another by 120°. It is noted that attachment ribs 62, 62' and 62" are merely provided as convenient means for attaching article clamping portions 28. Therefore, other suitable means to achieve this end are realizable without departure from the invention. It is further noted that although the described example embodies a clamp which permits selectable rotational orientation of the type described with reference to FIG. 6, a clamp having multiple article clamping portions could employ rather the integrated design features of the embodiments of FIGS. 1–4.

A example of an advantageous use for the embodiment as depicted in FIG. 9 is illustrated in FIG. 10. In the depicted embodiment, common plane P of the arms of article clamping portion 28 are oriented perpendicular with the longitudinal axis of collar 61. When collar 61 is clamped about support pole 2 oriented vertically, this configuration permits construction of a tripod base. A leg 65, which as depicted is conveniently of a flattened, elongated shape, is received within receiving channel 29 of article clamping portion 28, and secured therein by article clamping screws 11. For optimum securement, article clamping screws 11 extend into receiving holes provided in appropriate positions on either side of leg 65, in accordance with the embodiment as described with reference to FIG. 5c. Each leg 65 is of the same size and clamped in an outwardly and downwardly positioned manner to form a tripod base is described by the total thereof.

The present invention is particularly suited to its embodiment as a kit in which components for constructing a suitable display apparatus can be provided so that the user has at hand, with purchase of a kit, all that is needed to achieve that end.

Figure 11:
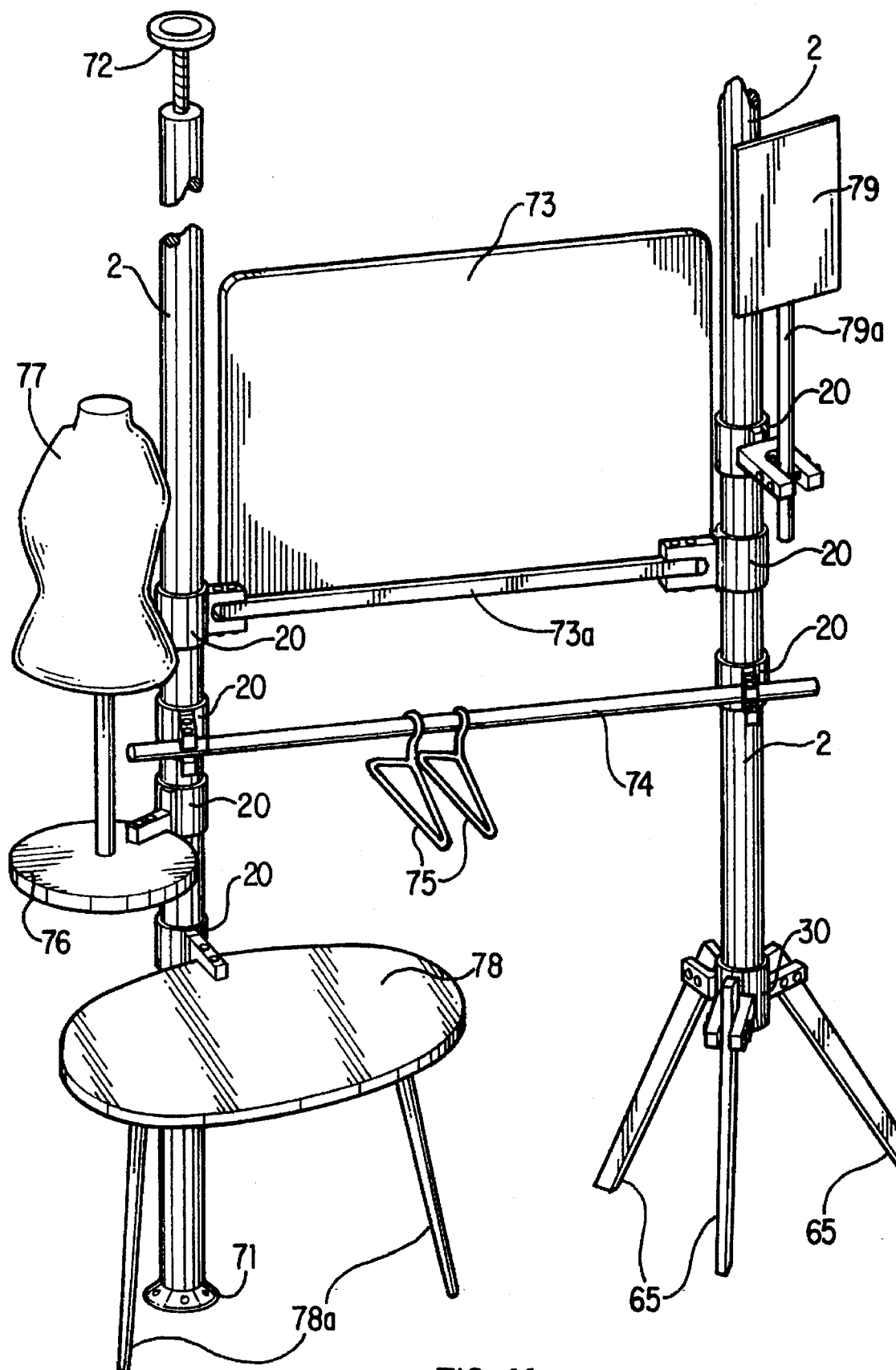
FIG. 11 is a perspective view of the display pole assembly incorporating various clamp embodiment examples in accordance with the invention.

Referring to FIG. 11, a constructed display structure is shown as an example of what such a kit optionally provides. In particular, the kit optionally includes a pair of support poles 2, vertically securable at floor and ceiling level by a suitable conventionally employed manner, for example by use of a floor securement flange 71 and/or a threaded ceiling compression member 72. A number of clamps 20 for single attachment of articles is also provided, along with which would also optionally be supplied a variety of hardware to be held thereby. For example, a display board 73 having a bar 73a running along a lower edge thereof for providing a clampable structure is clamped at either end to correspondingly spaced apart support poles 2. A clothing rod 74 for receiving hangers 75 is similarly clamped to extend between supporting poles 2. A small table 76, for carrying for example a clothing form 77, is also optionally provided. A large table 78 is also shown clamped at one side thereof to support pole 2 and supported at the other side by a pair of legs 78a.

For securing the above articles, clamps 20 are oriented with article clamping portions aligned with the longitudinal axis of the collar portions thereof as previously described. However, by orienting one of clamps 20 in a rotational orientation perpendicular to a post, a sign 79 may be held by clamping a vertical sign post 79a. Such a kit further optionally includes other parts, including for example a clamp 30 which permits multiple articles to be clamped thereby. A tripod base, for example, could be constructed by clamping an elongated leg 65 in each of the article clamping portions of clamp 30, and disposing clamp 30 at the terminal end of support pole 2, as shown in FIG. 11. Other display hardware could include in addition, although not specifically shown, tasking equipment, hooks, etc., each directed to appropriate function or for display of a particular article or media representation. Such a kit is conveniently boxed and supplied as a custom selected assortment of component parts to suit the particular needs of the purchaser.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a pole-supported apparatus in which at least one article is held in fastened engagement to a support pole at a selected position thereon by a clamp, said clamp comprising:

a collar divided substantially in half along a longitudinal axis thereof to comprise first and second halves, said collar being open at opposed ends thereof and shaped for receiving said support pole therethrough, said first and second halves being mounted to one another by a hinge to permit said collar to be opened for lateral reception of said support pole within said collar, and for allowing said collar to be closed about said support pole for captive reception of said support pole therethrough;

means for locking said collar in said closed position;

at least one article clamping portion attached to said collar and extending therefrom in an outward direction, said at least one article clamping portion including a pair of arms oriented along a common plane and fixed apart from one another to define a receiving channel therebetween for receiving therein a portion of said at least one article; and at least one arm of said pair of arms including a clamp means for engaging said portion of said at least one article, said clamp means having at least one article clamping screw threadably disposed in said at least one of said pair of arms and advanceable into said receiving channel to compress and hold said portion of said at least one article.

2. The clamp in accordance with claim 1, wherein said collar is substantially cylindrical.

3. The clamp in accordance with claim 1, wherein said common plane is substantially aligned with said longitudinal axis of said collar.

4. The clamp in accordance with claim 1, wherein said common plane is substantially perpendicular with said longitudinal axis of said collar.

5. The clamp in accordance with claim 1, wherein said pair of arms are substantially parallel with one another, and extend perpendicular to said longitudinal axis of said collar.

6. The clamp in accordance with claim 1, wherein said at least one article clamping screw is captively held in said at least one arm.

7. The clamp in accordance with claim 1, wherein said collar includes means for applying contact pressure on said support pole when said collar is oriented in a closed position to inhibit relative movement between said collar and said support pole.

8. The clamp in accordance with claim 1, wherein said article clamping portion is attached to said collar in a radial position substantially opposite said hinge.

9. In a pole-supported apparatus in which at least one article is held in fastened engagement to a support pole at a selected position thereon by a clamp, said clamp comprising:

a collar divided substantially in half along a longitudinal axis thereof to comprise first and second halves, said collar being open at opposed ends thereof and shaped for receiving said support pole therethrough, said first and second halves being mounted to one another by a hinge to permit said collar to be opened for lateral reception of said support pole within said collar and for allowing said collar to be closed about said support pole for captive reception of said support pole therethrough;

means for locking said collar in said closed position including:

a first flange disposed on said first collar half opposite said hinge and extending radially outward, said first flange having a tapped receiving hole adjacent said first collar half;

a second flange disposed on said second collar half opposite said hinge and extending radially outward; and a collar securement screw which extends through a clearance hole formed in said second flange, and which is threadingly received in said tapped receiving hole;

at least one article clamping portion attached to said collar and extending therefrom in an outward direction, said at least one article clamping portion including a pair of arms oriented along a common plane and fixed apart from one another to define a receiving channel therebetween for receiving therein a portion of said at least one article; and at least one arm of said pair of arms including a clamp means for engaging said portion of said at least one article, said clamp means having an engagement member advanceable into said receiving channel to compress and hold said portion of said at least one article.

10. The clamp in accordance with claim 9, wherein said collar securement screw is captively held in said flange.

11. A pole support clamp for holding tripod leg members in fastened engagement to a support pole at a selected position thereon, said clamp comprising:

a collar divided substantially in half along a longitudinal axis thereof to comprise first and second halves, said collar being open at opposed ends thereof and shaped for receiving said support pole therethrough, said first and second halves being mounted to one another by a hinge to permit said collar to be opened for lateral reception of said support pole within said collar and for allowing said collar to be closed about said support pole for captive reception of said support pole therethrough;

means for locking said collar in said closed position to clamp onto said pole;

three article clamping portions attached to said collar in equally spaced radial positions and extending therefrom in an outward direction, said article clamping portions each including a pair of arms oriented along a common plane perpendicular to said pole and fixed apart from one another to define a receiving channel therebetween for receiving therein a portion of one of said tripod leg members; and at least one arm of said pair of arms of each of said three article clamping portions including a clamp means for engaging said portion of said one of said tripod leg members, said clamp means having an engagement member advanceable into said receiving channel to compress and hold said portion of said one of said tripod leg members.

12. The clamp in accordance with claim 1, wherein said at least one article clamping portion is detachable from said collar.

13. A clamp in a pole-supported apparatus in which at least one article is held in fastened engagement to a support pole at a selected position thereon by said clamp, said clamp comprising:

a collar divided substantially in half along a longitudinal axis thereof to comprise first and second halves, said collar being open at opposed ends thereof and shaped for receiving said support pole therethrough, said first and second halves being mounted to one another by a hinge to permit said collar to be opened for lateral reception of said support pole within said collar, and for allowing said collar to be closed about said support pole for captive reception of said support pole therethrough;

means for locking said collar in said closed position;

at least one article clamping portion attached to said collar and extending therefrom in an outward direction, said at least one article clamping portion including a pair of arms oriented in a common plane and fixed apart from one another to define a receiving channel therebetween for receiving therein a portion of one of said at least one article;

at least one of said pair of arms having an engaging means for engaging said at least one article including at least one article clamping screw threadably disposed in at least one of said pair of arms; and fastening means for rotatably connecting said at least one article clamping portion to said collar to permit rotational positioning and fixing of said at least one article clamping portion relative to said collar on an axis substantially perpendicular to said pole.

14. The clamp in accordance with claim 13, wherein said clamp further comprises means for locking said article clamping portion at selectable predetermined rotational positions with respect to said collar.

15. The clamp in accordance with claim 14, wherein said means for locking said article clamping portion at a particular selected rotational position includes a geometrically-shaped protrusion carded on one of said collar and said article clamping portion attachment, and a correspondingly shaped receiving indentation formed in a remaining one.

16. The clamp in accordance with claim 15, wherein said geometrically-shaped protrusion and said correspondingly shaped receiving indentation are square-shaped.

17. A kit for constructing a pole-supported apparatus, said kit comprising:
   a support pole;
   an article for providing a desired function when attached to said support pole at a selected location and orientation; and
   a clamp for attaching said article to said pole including a collar divided substantially in half along a longitudinal axis thereof to comprise first and second halves, said collar being open at opposed ends thereof and shaped for receiving said support pole therethrough, said first and second halves being hingeably mounted to one another to permit said collar to be opened for lateral reception of said support pole within said collar, and for allowing said collar to be closed about said support pole for captive reception of said support pole therethrough, said clamp further comprising means for locking said collar in said closed position including flange members disposed along edges of said first and second halves of said collar opposite said hinge and fastening means for disengagably fastening said flange members together, at least one article clamping portion rotatably attached to said collar at one of said flange members and extending therefrom in an outward direction, said at least one article clamping portion including a pair of arms oriented along a common plane and separated from one another to define a receiving channel therebetween for receiving therein a portion of said article, and means carried on said article clamping portion for engaging said article and for inhibiting its motion relative thereto.

18. A clamp in a pole-supported apparatus in which at least one article is held in fastened engagement to a support pole at a selected position thereon by said clamp, said clamp comprising:
   a collar divided substantially in half along a longitudinal axis thereof to comprise first and second halves, said collar being open at opposed ends thereof and shaped for receiving said support pole therethrough, said first and second halves being mounted to one another by a hinge to permit said collar to be opened for lateral reception of said support pole within said collar, and for allowing said collar to be closed about said support pole for captive reception of said support pole therethrough;
   means for locking said collar in said closed position including:
      a first flange disposed on said first collar half opposite said hinge and extending radially outward;
      a second flange disposed on said second collar half opposite said hinge and extending radially outward; and
      a collar securement means for disengagably securing together said first and second flanges to clamp said collar on said pole;
   at least one article clamping portion extending from said collar in an outward direction, said at least one article clamping portion having an engaging means for engaging said at least one article; and
   fastening means for rotatably connecting said at least one article clamping portion to said collar at one of said first and second flanges, said fastening means including:
      said one of said first and second flanges including a boss member extending radially outward from said flange and having a length in a longitudinal direction of said one of said first and second flanges equal to a width of said one of said first and second flanges and said boss member extending laterally an entire lateral width of said one of said first and second flanges;
      said article receiving portion having a bridging member connecting said pair of arms, said bridging member defining a notch on an edge thereof having a length extending between said pair of arms a distance substantially equal to said entire lateral width of said one of said first and second flanges for engaging said boss member such that a common plane of said article receiving portion is positionable to be one of parallel and perpendicular to said pole; and
      securing means for maintaining said boss member within said notch and disengagably clamping together said article receiving portion and said one of said first and second flanges to permit rotational positioning and fixing of said article clamping portion relative to said collar on an axis substantially perpendicular to said pole.

19. A clamp in a pole-supported apparatus in which at least one article is held in fastened engagement to a support pole at a selected position thereon by said clamp, said clamp comprising:
   a collar divided substantially in half along a longitudinal axis thereof to comprise first and second halves, said collar being open at opposed ends thereof and shaped for receiving said support pole therethrough, said first and second halves being mounted to one another by a hinge to permit said collar to be opened for lateral reception of said support pole within said collar, and for allowing said collar to be closed about said support pole for captive reception of said support pole therethrough;
   means for locking said collar in said closed position including:
      a first flange disposed on said first collar half opposite said hinge and extending radially outward, said first flange having a tapped receiving hole adjacent said first collar half;
      a second flange disposed on said second collar half opposite said hinge and extending radially outward; and
      a collar securement screw which extends through a clearance hole formed in said second flange, and which is threadingly received in said tapped receiving hole;
   at least one article clamping portion extending from said collar in an outward direction, said at least one article clamping portion including a pair of arms oriented in a common plane and fixed apart from one another to define a receiving channel therebetween for receiving therein a portion of said at least one article;
   at least one of said pair of arms having an engaging means for engaging said at least one article including at least one article clamping screw threadably disposed in said at least one of said pair of arms; and fastening means for rotatably connecting said at least one article clamping portion to said collar, said fastening means including:

one of said first and second flanges including a boss member extending radially outward from said flange and having a length in a longitudinal direction of said one of said first and second flanges equal to a width of said one of said first and second flanges and said boss member extending laterally an entire lateral width of said one of said first and second flanges;

said article receiving portion having a bridging member connecting said pair of arms, said bridging member defining a notch on an edge thereof having a length extending between said pair of arms a distance substantially equal to said entire lateral width of said one of said first and second flanges for engaging said boss member such that said common plane of said pair of arms is positionable to be one of parallel and perpendicular to said pole; and securing means for maintaining said boss member within said notch and disengagably clamping together said article receiving portion and said one of said first and second flanges to permit rotational positioning and fixing of said article clamping portion relative to said collar on an axis substantially perpendicular to said pole.

20. The clamp in accordance with claim 19, wherein said at least one article clamping screw is captively held in said at least one arm.

21. A clamp in a pole-supported apparatus in which at least one article is held in fastened engagement to a support pole at a selected position thereon by said clamp, said clamp comprising:

a collar divided substantially in half along a longitudinal axis thereof to comprise first and second halves, said collar being open at opposed ends thereof and shaped for receiving said support pole therethrough, said first and second halves being mounted to one another by a hinge to permit said collar to be opened for lateral reception of said support pole within said collar, and for allowing said collar to be closed about said support pole for captive reception of said support pole therethrough;

means for locking said collar in said closed position including:

a first flange disposed on said first collar half opposite said hinge and extending radially outward, said first flange having a tapped receiving hole adjacent said first collar half;

a second flange disposed on said second collar half opposite said hinge and extending radially outward; and a collar securement screw which extends through a clearance hole formed in said second flange, and which is threadingly received in said tapped receiving hole;

at least one article clamping portion extending from said collar in an outward direction, said at least one article clamping portion having an engaging means for engaging said at least one article; and fastening means for rotatably connecting said at least one article clamping portion to said collar at one of said first and second flanges, said fastening means including:

said one of said first and second flanges including a boss member extending radially outward from said flange and having a length in a longitudinal direction of said one of said first and second flanges equal to a width of said one of said first and second flanges and said boss member extending laterally an entire lateral width of said one of said first and second flanges;

said article receiving portion having a bridging member connecting said pair of arms, said bridging member defining a notch on an edge thereof having a length extending between said pair of arms a distance substantially equal to said entire lateral width of said one of said first and second flanges for engaging said boss member such that a common plane of said article receiving portion is positionable to be one of parallel and perpendicular to said pole; and securing means for maintaining said boss member within said notch and disengagably clamping together said article receiving portion and said one of said first and second flanges to permit rotational positioning and fixing of said article clamping portion relative to said collar on an axis substantially perpendicular to said pole.

* * * * *